(No Model.)
F. E. ROBERTS.
BICYCLE.
No. 516,115. Patented Mar. 6, 1894.
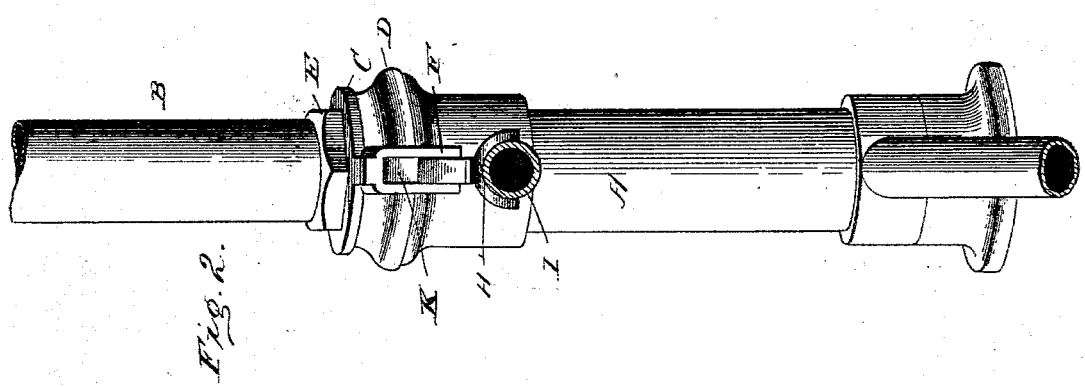
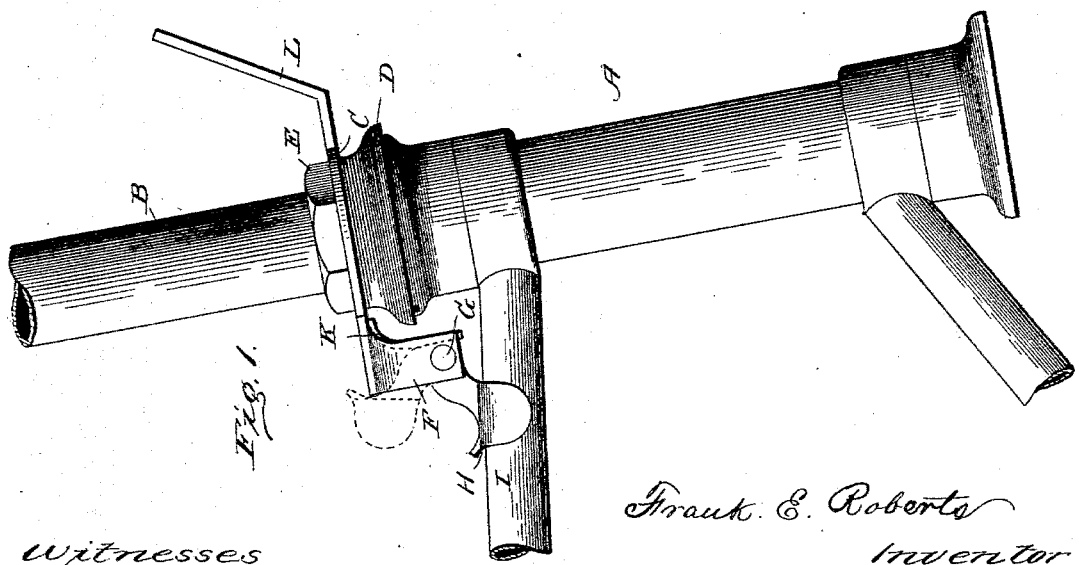
Witnesses
Edwin L. Bradford
Curtis Lammond
Frank E. Roberts
Inventor
By Wm. C. W. Intire
Attorney

UNITED STATES PATENT OFFICE.

FRANK E. ROBERTS, OF TOLEDO, OHIO, ASSIGNOR TO THE YOST MANUFACTURING COMPANY, OF SAME PLACE.

BICYCLE.

SPECIFICATION forming part of Letters Patent No. 516,115, dated March 6, 1894.

Application filed May 1, 1893. Serial No. 472,542. (No model.)

*To all whom it may concern:*

Be it known that I, FRANK E. ROBERTS, a citizen of the United States, residing at Toledo, in the county of Lucas and State of Ohio, have invented certain new and useful Improvements in Bicycles; and I do hereby declare the following to be a full, clear, and exact description of the invention, such as will enable others skilled in the art to which it appertains to make and use the same.

My invention has for its object to provide a means for temporarily holding the front or pivotal guiding wheel of a bicycle in alignment with the rear wheel so that when the rider dismounts, his wheel may be set at rest in any suitable manner against any supporting body or device without the exercise of the usual care to prevent the turning of the front wheel and consequent falling of the bicycle. And with this end in view my invention consists of a suitable plate secured rigidly to the handle bar tube, and provided with a vertically swinging or movable arm adapted to embrace each side of the top front cross bar of the frame in such manner that the handle bar tube will be held against rotation upon its axis of movement, all as will be hereinafter and in detail described.

In order that those skilled in the art to which my invention pertains may fully understand the same I will proceed to describe its construction and the manner of using the same, referring to the accompanying drawings in which—

Figure 1 is a side elevation of so much of a bicycle frame as is necessary to fully illustrate my invention; and Fig. 2 is a rear view thereof.

Similar letters indicate like parts in both figures of the drawings.

A represents the front tube of a bicycle frame and within which the rotatory handle bar tube B is located in the usual way, with ball bearings.

C is a flat plate embraced and clamped between the head D and nut E, which plate extends rearwardly and is turned down to form two ears F, to and between the lower ends of which is pivoted at G a swinging arm or brace H which is designed to embrace the top front cross bar I of the bicycle frame, as clearly illustrated at Fig. 1. The rear extension of the plate C is slotted or bifurcated so that the arm or brace H may be turned upwardly as indicated in dotted lines at Fig. 1, and a flat spring K is secured to the plate C with its lower end free as indicated, in order that it may hold the arm or brace H in either its downward or upward position.

The plate C is punched out so as to be slipped over the handle bar B in an obvious manner, and it may be extended forward as well as rearward, to form a lamp bracket L. I prefer to construct it in this manner, but it is obvious that the forward lamp bracket extension may be omitted without departing from the spirit of my invention. And while I have shown the arm or brace H as pivotally connected to the rear extension F of the plate C it will be understood that it may be arranged between the ears G, G, in any suitable manner to reciprocate vertically into or out of contact with the top cross bar I, as in either case the locking effect will be the same.

From the construction and arrangement shown it will be seen that when the arm H is turned or forced down so as to embrace each side of the top cross-bar I, the handle bar tube B will be locked against rotation and in such position that the front wheel will be held in alignment with the rear wheel of the bicycle, and that when the arm H is turned or lifted upward, as indicated by dotted lines Fig. 1, the tube B is free to swivel or turn and the bicycle may be guided in the usual manner through the medium of the handle bar.

I wish it to be understood that I may vary the details of construction in any particular without departing from the spirit of my invention, so long as I preserve the idea of connecting rigidly with the handle bar tube a locking arm or brace, which is adapted to be thrown into or out of a locking connection with the top cross bar I of the bicycle frame, or if thought desirable the locking device may be so connected with the handle bar tube as to interlock with the lower cross bar or frame tube.

What I claim as new, and desire to secure by Letters Patent, is—

1. The plate C secured to the handle bar tube, and provided with a bifurcated rear extension and ears F, in combination with a vertically movable arm H adapted to embrace and interlock with the front cross bar, substantially as and for the purpose set forth.

2. In combination with the plate C and ears F, constructed as described, the pivoted arm H and spring K, substantially as and for the purpose set forth.

3. The flat plate C adapted to be secured to the handle bar tube B, in the manner described and extended rearward and provided with the ears F and locking arm H, and also extended forward and upward to constitute a lamp bracket L, as hereinbefore described.

In testimony whereof I affix my signature in presence of two witnesses.

FRANK E. ROBERTS.

Witnesses:
M. D. BAKER,
G. F. MILLER.